UNITED STATES PATENT OFFICE.

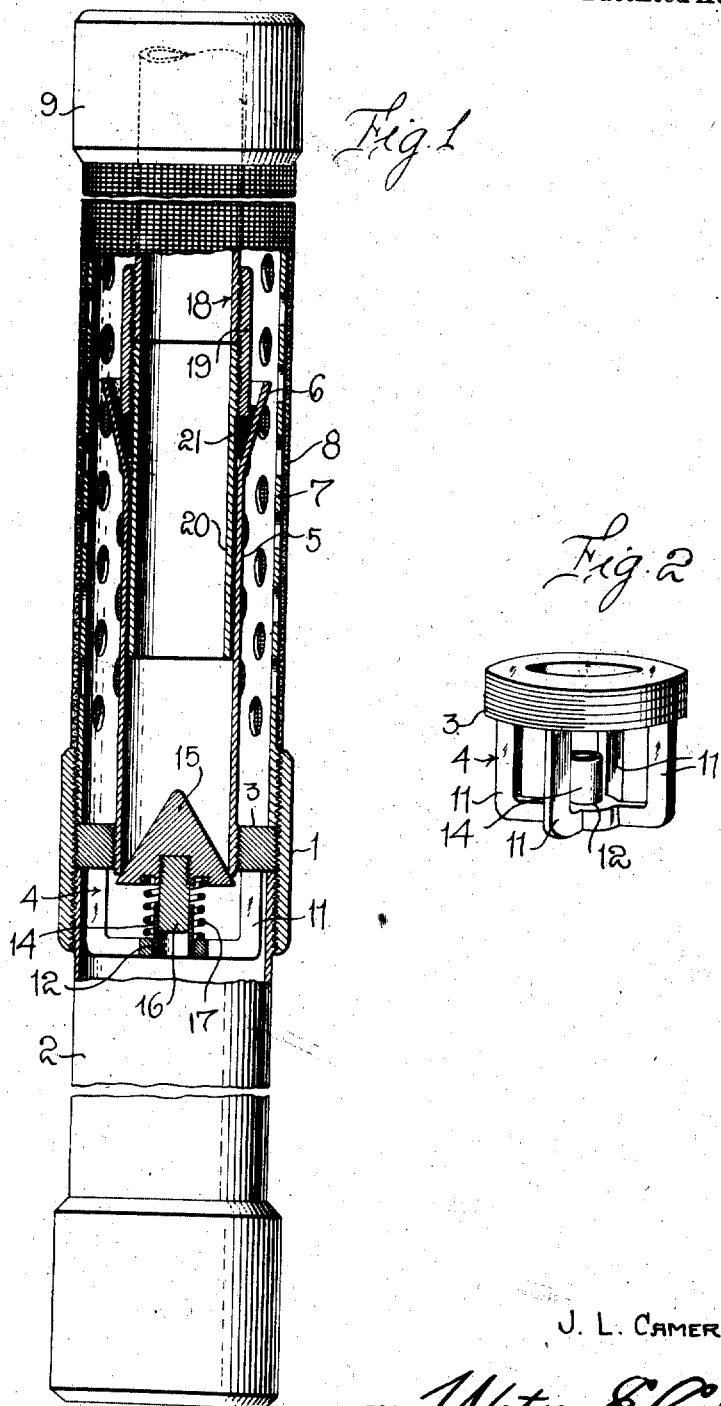

JARRETT L. CAMERON, OF EDGERLEY, LOUISIANA, ASSIGNOR OF ONE-HALF TO EVANGELINE IRON WORKS, LTD., OF VINTON, LOUISIANA, A CORPORATION OF LOUISIANA.

WELL-CLEANING DEVICE.

1,276,028.

Specification of Letters Patent.   Patented Aug. 20, 1918.

Application filed March 2, 1918.   Serial No. 220,020.

*To all whom it may concern:*

Be it known that I, JARRETT L. CAMERON, a citizen of the United States, residing at Edgerley, in the county of Calcasieu and State of Louisiana, have invented certain new and useful Improvements in Well-Cleaning Devices, of which the following is a specification, reference being had to the accompanying drawings.

This invention relates to certain improvements in well cleaning devices and has relation more particularly to a device of this general character especially designed and adapted for use in connection with the strainers for deep wells and it is an object of the invention to provide a novel and improved device of this general character which readily permits an effective cleansing of the outer surface of the strainer and which automatically closes in substantially an instantaneous manner when the valve is relieved of the pressure of the cleansing fluid.

It is also an object of the invention to provide a novel and improved device of this general type which has directly engaged therewith a washer pipe with which a wash pipe is adapted to coact when it is desired to cleanse the strainer.

The invention consists in the details of construction and in the combination and arrangement of the several parts of my improved device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in section illustrating a device constructed in accordance with an embodiment of my invention; and Fig. 2 is a view in perspective of the annular member and cage carried thereby as embodied in my improved device as herein disclosed.

As disclosed in the accompanying drawings 1 denotes an internally threaded coupling having engaged with the lower end portion thereof the pipe 2 and which pipe has its lower end open. Also in threaded engagement with the interior of the coupling 2 is an annular member or body 3 having depending therefrom the valve cage 4. The interior of the annular member or body 3 is also threaded and has engaged therewith the lower end portion of a washer pipe 5. The washer pipe 5 is of a predetermined length and has its upper or free end portion provided with the bell 6 for a purpose to be hereinafter more particularly set forth.

In threaded engagement with the upper portion of the interior of the coupling 1 is the perforate pipe 7 embodied in the strainer and disposed around said pipe 7 is a screening element 8 preferably of wire. The upper end portion of the pipe 7 is provided with a coupling 9 for a purpose which is believed to be obvious.

The cage 4 comprises a plurality of arms 11 spaced from the member or body 3 and integrally connected and radiating from a common center, and such central portion is provided with an opening 12 in which is threaded an upstanding stem guide 14. The upper end of the stem guide 14 terminates a predetermined distance below the member or body 3 so that the valve 15 may have desired downward movement relative to the lower end of the washer pipe 5. As herein disclosed the valve 15 is conical in shape and is provided at the axial center of its base with a depending stem 16 which is loosely directed within the guide 14. Interposed between the arms 11 and the base of the valve 15 is an expansible member 17 herein disclosed as a coil spring surrounding the guide 14 and the stem 16 and which serves to constantly urge the valve 15 toward the lower or adjacent end portion of the washer pipe 5. The major diameter of the valve 15 is such as to permit the valve 15 to seal the lower end of the washer pipe 5 when the same is at the limit of its movement under the influence of the expansible member 17 so that the ingress of sand or other foreign matter into the washer pipe 5 or within the perforate pipe 7 is prevented.

18 denotes a wash pipe of a length to extend above the surface of the ground when the strainer is in applied position within a well and the lower end of said pipe 18 has in threaded engagement therewith a coupling 19. Threaded within the lower portion of the coupling 19 is the upper end portion of the nipple 20. The nipple 20 is of such a length as to extend within the washer pipe 5 and terminate below the bell 6 thereof. Surrounding the nipple 20 and below the coupling 19 is a gasket or packing 21 which coacts with the bell 6 to effect a water tight joint when the nipple 20 is inserted within the washer pipe 5.

My improved device is particularly adapted for use in connection with oil or water wells drilled by the hydraulic process. In the drilling of oil wells particularly in the extreme Southern portion of the United States the bore within the oil bearing sand stratum fills with a very thick heavy mud and this must be washed out with clear water when the strainer is set. After the strainer has been set, the nipple 20 coupled to the wash pipe 18 is inserted within the washer pipe 5 and clear water is pumped or otherwise delivered under pressure within the washer pipe 5. The pressure of this water causes the valve 15 to assume an open position so that the water may be discharged into the bottom of the well or bore from the lower end of the pipe 2. The pressure on the water causes the same to travel upwardly exteriorly of the pipe 2 and the strainer so that the mud surrounding the strainer is forced upwardly upon the ground surface. When the well or bore is sufficiently washed the delivering of water under pressure is stopped and the wash pipe 18 removed. Upon the stopping of the water pressure the valve 15 returns substantially instantaneously into closed position. When closed the valve 15 serves to prevent leakage through the pipe 2 when the well is being pumped.

The clear water within the well and exteriorly of a strainer and the pump tubing will then be drawn in turn within the strainer and effect a thorough cleansing thereof.

While I have herein illustrated my valve 15 of a conical form it is to be understood that if desired such valve may be of spherical formation, but it is believed that a detailed description and illustration of such formation is unnecessary.

It has also been found in practice that the upper or free end portion of the washer pipe 5 affords a convenient means to facilitate the proper positioning of the annular member or body 3 within the coupling 1.

From the foregoing description, it is thought to be obvious that a well cleaning device constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a coupling and a well strainer engaged therewith, an annular member mounted within the coupling and provided with a cage extending in a direction away from the strainer, a washer pipe engaged with said member and extending inwardly of the strainer, the inner end portion of the washer pipe being of bell formation, a valve arranged within the cage and coacting with the connected end portion of the washer pipe, a wash pipe insertible within the strainer and extending within the inner portion of the washer pipe and terminating below the bell thereof, said wash pipe inwardly of its end insertible within the washer pipe being provided with an annular enlargement, and a gasket surrounding the wash pipe and carried thereby below the enlargement, said gasket engaging the inner wall of the bell portion of the washer pipe when the wash pipe is inserted within the washer pipe.

2. In combination with a coupling and a well strainer engaged therewith, a washer pipe supported within the strainer, the inner end portion of the washer pipe being of bell formation, a normally seated valve coacting with the outer end portion of the washer pipe, a wash pipe insertible within the strainer and extending within the inner portion of the washer pipe and terminating below the bell thereof, said wash pipe inwardly of its end insertible within the washer pipe being provided with an annular enlargement, and a gasket surrounding the wash pipe and carried thereby below the enlargement, said gasket engaging the inner wall of the bell portion of the washer pipe when the wash pipe is inserted within the washer pipe.

In testimony whereof I hereunto affix my signature in the presence of two witnesses.

JARRETT L. CAMERON.

Witnesses:
J. F. REANEY,
N. ROYER.